United States Patent Office 3,379,635
Patented Apr. 23, 1968

3,379,635
METHOD OF PRESERVING THE CATALYTIC ACTIVITY OF SENSITIVE CATALYSTS
Hans H. von Doehren, Frankfurt am Main, and Margarete Jüng, Nieder-Eschbach im Taunus, Germany, assignors to Varta Aktiengesellschaft, Hagen, Westphalia, Germany, a corporation of Germany
No Drawing. Continuation-in-part of application Ser. No. 327,501, Dec. 2, 1963. This application Jan. 15, 1965, Ser. No. 425,923
Claims priority, application Germany, Dec. 1, 1962, V 23,359
32 Claims. (Cl. 204—284)

ABSTRACT OF THE DISCLOSURE

Process for making a pyrophoric catalyst catalytically stable by contacting it with a specific alcohol and collecting a catalytically stable, superficially dry or wet catalyst.

---

This application is a continuation-in-part of copending application Ser. No. 327,501, filed Dec. 2, 1963, now abandoned, and entitled, "Method of Preserving the Catalytic Activity of Sensitive Catalysts."

This invention relates to a method of preserving the activity of catalysts which are sensitive to oxygen, air, or catalyst poisons, such as sulfur dioxide or hydrogen sulfide.

It is well known that many catalysts, when prepared in an active form, are highly sensitive to oxidation, becoming pyrophoric and subsequently becoming inactive due to exposure to air or an oxygen-containing atmosphere and/or to catalyst poisons. The problem of handling, storing, and transporting active catalysts, while preventing them from losing their activity, therefore, is an important one.

It is also well known that, in a hydrogenation process, it is often desired to discontinue the reaction, to recover the catalyst, and to store it for some time before reusing it. The problem of preserving the activity of the catalyst during this period of storage is likewise an important one.

Many methods for stabilizing and/or preserving such catalysts have been disclosed. Probably the most widely used method is the one in which the freshly prepared catalyst is transferred directly and without exposure to an oxidizing agent into an inert medium such as hydrogen, carbon dioxide, nitrogen, water, hydrocarbons, methanol and/or ethanol. All these materials possess certain disadvantages. Handling of the catalyst in a gaseous medium is rather difficult because air cannot always be excluded. Water, at best, only reduces the rate of deterioration and does not prevent it altogether.

In all cases in which a liquid is used to protect the catalyst, it must be completely covered with an excess of said liquid and the liquid protecting agent must be removed prior to use.

The present invention has as its main object to provide an improved method of retaining the activity of a catalyst during periods of non-use.

Another object of this invention is to provide a method for storing, handling, and transporting freshly prepared active catalysts.

Still another object of this invention is to provide a method which permits to use a catalyst intermittently during a certain period of time.

A further object of the present invention is to preserve the activity of active catalysts, which are incorporated in porous bodies. This feature is of special importance with respect to the storage and handling of catalytically activated electrodes, as they are employed, for instance, in fuel cells or in other electrochemical devices, such as in electrolysis apparatus, devices for the electrochemical conversion of chemical compounds by hydrogenation or dehydrogenation.

The above and other objects and advantages of the present invention will become apparent as the description proceeds.

In principle these objects and advantages are accomplished by maintaining the catalysts in a wet condition with an aliphatic polyvalent alcohol with at least two hydroxyl groups. Such polyvalent alcohols must, of course, be liquid at the operation temperature of the catalyst, water-soluble, soluble in alkali metal hydroxide solution, soluble to a higher degree than in water, and hardly volatile at the temperature at which the catalyst, for instance, the catalyst electrode is stored.

The present invention can be used to protect all kinds of catalysts as they are used in hydrogenation or dehydrogenation processes. It is especially useful in the protection of catalysts such as Raney metal catalysts containing, for instance, cobalt, nickel, or iron as active components, wherein additional promotors, precious metals, preferably finely divided platinum metals which may or may not be fixed on carrier materials may be present.

Another group of catalysts which can be protected according to the present invention is represented by metal compounds such as metal borides and the like, as they are widely used in hydrogenation and dehydrogenation processes.

Suitable alcohols which can be used to maintain the catalysts in wet condition according to the present invention include ethylene glycol, glycerol, propylene glycol, and higher aliphatic polyvalent alcohols which are not restricted to straight-chain molecular structures. It is, of course, also possible to use compounds of this kind which have a cylcoaliphatic structure such as cyclohexanediols. These alcohols may also be applied in mixture with each other. However, it is important to use said compounds in a liquid state so that the catalysts are completely wetted. In some cases it may be necessary to use hot solution in order to decrease the viscosity and surface tension of the liquid.

It is also possible to treat the catalysts with vapors of the polyvalent alcohol instead of wetting them therewith.

Another way of impregnating the catalyst consists in carrying out the treatment with the polyvalent alcohol in a vacuum whereby the catalyst is placed in a vessel which is evacuated and into which the polyvalent alcohol is introduced.

Furthermore, solvents may be added to the polyvalent alcohol. Solvents can be employed, if the applied polyvalent alcohols or mixtures thereof have a higher viscosity. Such solvents are, for instance, the mono- and diesters of polyvalent alcohols, such as glycerol monoacetate or glycol diacetate or other usual solvents, such as water, methanol, ethanol, acetone, methyl ethyl ketone and ethyl ether or mixtures thereof.

In place of the above mentioned polyvalent alcohols, polymeric compounds with at least two hydroxyl groups may also be employed.

Such polymeric compounds are, for instance, polyethylene glycol, polypropylene glycol, polyvinyl alcohols, and partially esterified or etherified polyvalent alcohols, which must be soluble in water or, at least, in alkali metal hydroxide solutions. It is of advantage to use preferably compounds which are readily soluble in water. The preferred molecular weight of polyethylene glycol is within the range of 100 to about 600, that of the polypropylene glycol within the range of 100 to 200 respectively.

It has been found that the polyvalent alcohols and solvents, especially ethylene glycol employed to the present invention contain small amounts of water, which does not influence the preserving method and allows the use of cheaper industrial products.

When carrying out the procedure according to the present invention, the active pyrophoric catalyst is immersed, soaked, or sprayed immediately after its preparation or when removed from the hydrogenation mixture, with a sufficient quantity of the preserving liquid. If necessary, an excess of said liquid may be applied, which subsequently is removed after completely wetting the catalyst. The resulting wet catalyst can be exposed to air and handled and manipulated without any additional precautionary measures. It will not lose any of its initial catalytic activity even on storing for several days. Surprisingly even samples of finely divided Raney metal catalysts which are notoriously difficult to handle in an oxidizing atmosphere will retain their catalytic activity over a considerably prolonged period of time when treated as described above.

The following examples serve to illustrate the present invention without, however, limiting the same thereto.

EXAMPLE 1

A porous two-layer, double-skeleton catalyst electrode is prepared as follows:

2 g. of a mixture containing 1 part, by weight, of Raney nickel alloy (50%, by weight, of nickel and 50%, by weight, of aluminum) and 1.5 parts, by weight, of carbonyl nickel powder are used for preparing the top layer. The working layer (17 g.) consists of a mixture of 1 part, by weight, of said Raney nickel alloy and 1.3 parts, by weight, of carbonyl nickel powder.

Both layers are pressed together under a pressure of 4 tons/sq. cm. and the resulting catalyst body is subsequently sintered in a hydrogen atmosphere at 690° C.

The inactive component of the Raney alloy is then leached out by a treatment with a hot aqueous 6 N potassium hydroxide solution. The thus activated electrode is washed with distilled water and immersed in the required quantity of ethylene glycol whereafter vacuum is applied thereto in order to remove the enclosed gaseous hydrogen so as to assure complete wetting within the pores. Excess ethylene glycol is poured off and blotted off from the surface of the electrode by means of sheets of filtered paper. The electrode is thereafter exposed to the air. No decrease in its catalytic activity is observed after 24 hours. The electrode is mounted in a fuel cell wherein an open circuit voltage of 1135 mV. is determined against a saturated calomel electrode at a hydrogen pressure of 1.4 atm. and a concentration of the electrolyte of 6 N KOH potassium hydroxide solution. The open circuit voltage and the load characteristics are exactly the same as those observed with freshly prepared electrodes mounted in an inert atmosphere.

EXAMPLE 2

A freshly prepared activated Raney cobalt catalyst (from an alloy containing 60%, by weight, of aluminum and 40%, by weight, of cobalt) is washed with water and transferred into glycerol. The mixture is stirred and excess glycerol is decanted. The thus soaked powder is then superficially dried between layers of filtered paper.

The pyrophoric properties of the catalyst are completely suppressed even on exposure of the powder to air for 12 hours. The rate of hydrogenation of nitrobenzene compared with the rate obtained with a freshly prepared catalyst is not changed at all.

EXAMPLE 3

An electrode is prepared according to Example 1 using a Raney cobalt alloy, in place of the Raney nickel alloy, and carbonyl iron powder, in place of carbonyl nickel powder. Pressing, sintering, and activation of the catalyst is carried out under the same conditions as described in Example 1, except that 25 mg. of mercuric nitrate are added to the activation solution 24 hours after the initial treatment.

The electrode is washed with water and placed in polyethylene glycol of an average degree of polymerisation of 3.5 units per molecule. The resulting electrode is completely stable and does not loose its catalytic activity when framed in a plastic frame by injection molding.

EXAMPLE 4

A compressed carbon electrode containing palladium and platinum catalysts in finely divided form is temporarily removed from a fuel cell. In order to prevent inactivation by air, the electrode is wetted with a low molecular polypropylene glycol and can then be stored. After reassembling, the fuel cell is operated without a drop in potential.

By way of contrast another electrode which is exposed to air without being treated as described above can be operated at the same potential with only one fifth of the initial load.

EXAMPLE 5

An electrode prepared according to Example 3 is wetted with a solution of 1 part, by weight, of a partially esterified polyvinyl alcohol dissolved in 10 parts, by weight, of glycerol mono-acetyl ester. This method of protection yields the same results as described in Example 3.

EXAMPLE 6

A catalyst sieve electrode is made by arranging two identical nickel micro-sieves having a total open surface area of 20%, perforations of 300 diameter, and a thickness of 70μ parallel to each other and spaced at a distance of 4 mm. Arranged between said sieves is a bed of Raney nickel catalyst impregnated and wetted by cyclohexanediol.

(a) The Raney nickel catalyst is prepared by pulverizing a nickel aluminum alloy, leaching out the aluminum with an alkali metal hydroxide solution, washing the resulting active powder with water, and impregnating said powder with 1,4-cyclohexanediol. The best way of impregnating the Raney nickel powder consists in spraying the cyclohexanediol on the moist powder which is placed on a fine-meshed screen. Excess cyclohexanediol is then drained off.

(b) Another method of preparing an active nickel catalyst consists in reducing nickel formate at 250° C. in a hydrogen stream for 20 minutes and impregnating the nickel powder with glycerol as described hereinabove. For use as fuel cell electrode the catalyst is arranged between the microsieves described above.

EXAMPLE 7

A catalyst consisting of nickel boride ($NiB_2$) is wetted with a mixture of ethylene glycol and propylene glycol (1:1).

The resulting catalyst is arranged between microsieves as described in Example 6, thus yielding a catalyst sieve electrode.

EXAMPLE 8

An electrode is prepared according to Example 1, using a Raney nickel alloy, pressing, sintering and activating being exactly identical as described in Example 1.

The electrode is washed with water and immersed in an aqueous solution containing 5% by weight of pentaerythritol (3-propanediol). The excess solution is poured off and blotted from the surface by means of a filter paper. Thereafter the electrode is exposed to air. No decrease in its catalytic activity is observed after 48 hours.

EXAMPLE 9

A freshly prepared activated Raney cobalt catalyst starting from an alloy containing 50% by weight of aluminum and 50% by weight of cobalt is washed with water and placed on a fine-meshed screen. The powder is sprayed with a hot solution containing 10% by weight of ethyleneglycol in ethyleneglycol-monomethyl-acetate. The excess solution is drained off. This method of preparing yields the same results as described in Example 8.

EXAMPLE 10

An activated Raney cobalt catalyst powder freshly prepared as described in Example 9 is impregnated with tetramethyleneglycol at a temperature of 65° C. The excess polyvalent alcohol is drained off by suction. No decrease in its catalytic activity is observed when the catalyst powder is reactivated by washing with an aqueous 2 N sodium hydroxide solution 14 days later.

In conclusion it can be said that this method of preserving may be employed for all catalytic materials which contain adsorbed or chemisorbed hydrogen either due to the method of preparation or due to the conditions of usage of said catalyst materials.

Of course, many changes and variations in the type of catalysts, polyvalent alcohols and solvents and their amounts and in the impregnating and wetting conditions, temperature, duration, pressure employed, in the methods of working up the treated catalysts and of using them as fuel cell electrodes, and the like may be made by those skilled in the art in accordance with the principles set forth herein and in the claims annexed hereto.

We claim:

1. In a process of producing a stable, highly active catalyst, the steps which comprise impregnating a catalyst losing its activity on storage in an oxididing atmosphere, with an aliphatic polyhydric alcohol which is soluble in aqueous alkali metal hydroxide and essentially not volatile at ambient temperature so as to completely wet the catalyst surface removing excess alcohol and collecting the resulting catalytically stable, superficially dry catalyst.

2. The process according to caim 1, wherein the aliphatic alcohol is polyethylene glycol.

3. The process according to claim 2, wherein the polyethylene glycol is a polyethylene glycol of an average molecular weight of 100 to 600.

4. The process according to claim 1, wherein the aliphatic alcohol is polypropylene glycol.

5. The process according to claim 4, wherein the polypropylene glycol is a polypropylene glycol of an average molecular weight of 100 to 200.

6. The process according to claim 1, wherein the catalyst is selected from the group consisting of Raney metal catalysts, platinum metal catalysts, and metal boride catalysts.

7. The process according to claim 1, wherein the catalyst is a catalyst deposited on a carrier material in a finely divided state.

8. The process according to claim 1, wherein the catalyst is a catalyst incorporated in a porous body.

9. The process according to claim 1, wherein the aliphatic polyhydric alcohol is ethylene glycol.

10. The process according to claim 1, wherein the aliphatic alcohol is propylene glycol.

11. The process according to claim 1, wherein the aliphatic alcohol is glycerol.

12. The process according to claim 1, wherein the aliphatic alcohol is polyvinyl alcohol.

13. The process according to claim 1, wherein the aliphatic alcohol is cyclohexanediol.

14. The highly active catalyst substantially retaining its activity on storage in an oxidizing atmosphere, said catalyst being impregnated and its surface being completely wetted with a polyhydric aliphatic alcohol when not in use.

15. The catalyst according to claim 14, wherein the aliphatic alcohol is ethylene glycol.

16. The catalyst according to claim 14, wherein the aliphatic alcohol is glycerol.

17. The catalyst according to claim 14, wherein the aliphatic alcohol is polyvinyl alcohol.

18. The highly active, porous, two-layer, double skeleton catalyst electrode substantially retaining its activity on storage in an oxidizing atmosphere, said double skeleton catalyst electrode being impregnated and its surface being completely wetted with a polyhydric aliphatic alcohol when not in use.

19. The double skeleton catalyst electrode according to claim 18, wherein the catalyst layers are composed of a mixture of Raney nickel and carbonyl nickel and are pressed and sintered to form a unitary body and wherein the impregnated and wetting polyhydric aliphatic alcohol is ethylene glycol.

20. The double skeleton catalyst electrode according to claim 18, wherein the catalyst layers are composed of a mixture of Raney cobalt and carbonyl iron and are pressed and sintered to form a unitary body and wherein the impregnating and wetting polyhydric aliphatic alcohol is polyethylene glycol.

21. The highly active catalyst sieve electrode substantially retaining its activity on storage in an oxidizing atmosphere, said catalyst sieve electrode being impregnated and its surface being completely wetted with a polyhydric aliphatic alcohol when not in use.

22. The catalyst sieve electrode according to claim 21, wherein the catalyst material is Raney nickel arranged between two nickel microsieves.

23. The catalyst sieve electrode according to claim 21, wherein the catalyst material is nickel boride arranged between two microsieves and wherein the impregnating and wetting polyhydric aliphatic alcohol is a mixture of ethylene glycol and propylene glycol.

24. The process of making a pyrophoric catalyst catalytically stable which comprises:
contacting the pyrophoric catalyst with an aliphatic polyhydric alcohol which is soluble in aqueous alkali metal hydroxide and essentially not volatile at ambient temperature,
removing said catalyst from contact therefrom,
removing from the catalyst the excess alcohol, thereby superficially drying said catalyst, and
collecting the catalytically stable, superficially dry catalyst.

25. The process of claim 24 in which prior to the contacting step the pyrophoric catalyst is contacted with an aqueous medium.

26. The process of claim 24 which comprises subsequently to the collecting step, the step of immersing the active catalyst in an aqueous alkaline solution.

27. The process of claim 24 in which the contacting step is performed with vapors of the alcohol.

28. The process of claim 24 in which the contacting step is performed by spraying the alcohol on the catalyst.

29. The process of claim 24 in which the catalyst is a powder.

30. The process of making a pyrophoric catalyst catalytically stable which comprises:
contacting the wet pyrophoric catalyst with an aliphatic polyhydric alcohol which is soluble in aqueous alkali metal hydroxide and essentially not volatile at ambient temperature,
removing said catalyst from contact therefrom,
removing from the catalyst the excess alcohol, thereby superficially drying said catalyst, and
collecting the catalytically stable, superficially dry catayst.

31. The process of making a pyrophoric catalyst catalytically stable which comprises:
contacting the pyrophoric catalyst with an aliphatic polyhydric alcohol which is soluble in aqueous alkali metal hydroxide and essentially not volatile at ambient temperature,
removing said catalyst from contact therefrom, and maintaining the catalytically stable catalyst in wet condition with said alcohol.

32. The process of making a pyrophoric catalyst catalytically stable which comprises:

contacting the pyrophoric catalyst with an aliphatic polyhydric alcohol which is soluble in aqueous alkali metal hydroxide and essentially not volatile at ambient temperature, removing said catalyst from contact therefrom, removing from the catalyst the excess alcohol and collecting the catalytically stable, wet catalyst.

References Cited

UNITED STATES PATENTS

| | | | |
|---|---|---|---|
| 3,121,031 | 2/1964 | Gruneberg et al. | 136—86 |
| 3,139,408 | 6/1964 | Tumer et al. | 252—477 |
| 3,150,011 | 9/1964 | Winsel et al. | 136—120 |
| 3,238,068 | 3/1966 | Hipp | 136—120 |

HOWARD S. WILLIAMS, *Primary Examiner.*

D. R. JORDAN, *Assistant Examiner.*